(12) United States Patent
Calder et al.

(10) Patent No.: US 9,004,407 B2
(45) Date of Patent: Apr. 14, 2015

(54) ANTI-ICING SYSTEM AND METHOD FOR PREVENTING ICE ACCUMULATION

(75) Inventors: David P. Calder, Baltimore, MD (US); Graham Howarth, Baltimore, MD (US)

(73) Assignee: Middle River Aircraft Systems, Baltimore, MD (US)

( * ) Notice: Subject to any disclaimer, the term of this patent is extended or adjusted under 35 U.S.C. 154(b) by 1189 days.

(21) Appl. No.: 12/343,820

(22) Filed: Dec. 24, 2008

(65) Prior Publication Data

US 2010/0155538 A1  Jun. 24, 2010

(51) Int. Cl.
| | |
|---|---|
| *B64D 15/00* | (2006.01) |
| *B64D 15/12* | (2006.01) |
| *H05B 3/14* | (2006.01) |
| *H05B 3/34* | (2006.01) |
| *B64D 33/02* | (2006.01) |

(52) U.S. Cl.
CPC ........ *B64D 15/12* (2013.01); *B64D 2033/0233* (2013.01); *H05B 3/145* (2013.01); *H05B 3/347* (2013.01); *H05B 2203/005* (2013.01); *H05B 2203/013* (2013.01); *H05B 2203/014* (2013.01); *H05B 2203/017* (2013.01); *H05B 2203/033* (2013.01)

(58) Field of Classification Search
CPC ............................... B64D 15/12; B64D 15/14
USPC .......... 244/134 D, 134 R; 219/202, 201, 546, 219/547
See application file for complete search history.

(56) References Cited

U.S. PATENT DOCUMENTS

| | | | |
|---|---|---|---|
| 3,933,327 A | 1/1976 | Cook et al. | |
| 4,738,416 A | 4/1988 | Birbragher | |
| 4,942,078 A * | 7/1990 | Newman et al. | ............... 428/192 |
| 5,088,277 A | 2/1992 | Schulze | |
| 5,288,355 A | 2/1994 | Leffel et al. | |
| 5,581,054 A | 12/1996 | Anderson et al. | |
| 5,654,060 A | 8/1997 | Holman et al. | |
| 5,768,778 A | 6/1998 | Anderson et al. | |
| 5,934,617 A | 8/1999 | Rutherford | |
| 6,079,670 A | 6/2000 | Porte | |
| 6,194,685 B1 | 2/2001 | Rutherford | |

(Continued)

FOREIGN PATENT DOCUMENTS

| | | |
|---|---|---|
| DE | 2707317 A1 | 8/1978 |
| DE | 202007006212 U1 | 6/2007 |

(Continued)

OTHER PUBLICATIONS

International Search Report issued in connection with corresponding PCT Application No. PCT/US2009/066997 on Feb. 25, 2010.

(Continued)

*Primary Examiner* — J. Woodrow Eldred
(74) *Attorney, Agent, or Firm* — General Electric Company; William S. Munnerlyn (57) ABSTRACT

An anti-icing system includes a component surface having a composite structure including a composite layer, and at least one heating element formed within the composite layer, wherein the heating element is configured to provide a transfer of heat to the component surface.

14 Claims, 4 Drawing Sheets

(56) References Cited

U.S. PATENT DOCUMENTS

| | | | |
|---|---|---|---|
| 6,237,874 | B1 | 5/2001 | Rutherford et al. |
| 6,279,856 | B1 | 8/2001 | Rutherford et al. |
| 6,330,986 | B1 | 12/2001 | Rutherford et al. |
| 6,848,656 | B2 | 2/2005 | Linton |
| 7,291,815 | B2 * | 11/2007 | Hubert et al. ............... 219/535 |
| 7,780,117 | B2 * | 8/2010 | Botura et al. ............ 244/134 D |
| 2007/0210073 | A1 | 9/2007 | Hubert et al. |
| 2008/0102292 | A1 | 5/2008 | Vontell et al. |
| 2008/0179448 | A1 * | 7/2008 | Layland et al. ............. 244/1 N |
| 2011/0024568 | A1 * | 2/2011 | Bardwell ................. 244/134 D |
| 2011/0114895 | A1 * | 5/2011 | Lengsfeld .................... 252/503 |
| 2011/0290784 | A1 * | 12/2011 | Orawetz et al. ............. 219/486 |

FOREIGN PATENT DOCUMENTS

| | | |
|---|---|---|
| JP | 04308251 A | 10/1992 |
| JP | 08207191 A | 8/1996 |
| JP | 2008115458 A | 5/2008 |
| JP | 2010526221 A | 7/2010 |
| WO | 20050087589 A1 | 9/2005 |
| WO | 2008136743 A1 | 11/2008 |

OTHER PUBLICATIONS

Unofficial English translation of JP Office Action dated Jan. 8, 2014, issued in connection with corresponding JP Application No. 2011-543548.

* cited by examiner

ANTI-ICING SYSTEM AND METHOD FOR PREVENTING ICE ACCUMULATION

BACKGROUND OF THE INVENTION

The field of the disclosure relates generally to aircraft anti-icing systems, and more specifically to a system for electrically preventing the accumulation of ice build-up on leading edge surfaces.

Gas turbine engines typically include an inlet, a fan, low and high pressure compressors, a combustor, and at least one turbine. The compressors compress air which is channeled to the combustor where it is mixed with fuel. The mixture is then ignited for generating hot combustion gases. The combustion gases are channeled to the turbine(s) which extracts energy from the combustion gases for powering the compressor(s), as well as producing useful work to propel an aircraft in flight or to power a load, such as an electrical generator.

Aircraft, during flight and/or while on the ground, may encounter atmospheric conditions that cause the formation of ice on airfoils and other surfaces of the aircraft structure, including wings, stabilizers, rudder, ailerons, engine inlets, propellers, rotors, fuselage and the like. Accumulating ice, if not removed, can add excessive weight to the aircraft and alter the airfoil configuration, causing undesirable and/or dangerous flying conditions. More specifically, if engines are operated within icing conditions at low power for extended periods of time, ice accumulation within the engine and over exposed engine structures may be significant. Over time, continued operation of the engine, a throttle burst from lower power operations to higher power operations, and/or vibrations due to either turbulence or asymmetry of ice accretion, may cause the accumulated ice build-up to be ingested by the high pressure compressor. Such a condition, known as an ice shed, may cause the compressor discharge temperature to be suddenly reduced. In response to the sudden decrease in compressor discharge temperature, the corrected core speed increases in the aft stages of the high pressure compressor. This sudden increase in aft stage corrected core speed may adversely impact compressor stall margin. In some cases, it may also lead to an engine flame out.

To facilitate preventing ice accumulation within the engine and over exposed surfaces adjacent the engine, at least some known engines include a de-icing system to reduce ice build-up on the gas turbine engine struts. Some known de-icing systems mechanically remove the ice with the use of pneumatic boots. In such a system, the leading edge zone or wing or strut component of an aircraft is covered with a plurality of expandable cuffs that are inflatable with a pressurized fluid, such as air. When inflated, the cuffs expand and crack accumulating ice which is then dispersed into the air stream. Although pneumatic boots have been used on commercial aircraft and some light twin or small jet aircraft, the system, which requires an air compressor and vacuum system, is expensive and adds appreciable weight to light aircraft. A similar mechanical system employs multiple juxtaposed electro-expulsive elements placed within an elastomeric or metal clad boot that is attachable to airfoil surfaces. When an electrical impulse is applied, the force effects an impulse separation of one element from the other that is sufficient to mechanically throw off thin accretions of ice. In each of these mechanical systems, boot operation affects the airfoil characteristics of the wing, with the result that the boots cannot be operated during landing or takeoff. In addition to the drawbacks of the added weight and expense of current mechanical ice removal systems, each of these systems requires visual attention to the degree of ice build-up and careful timing of activation for maximum effectiveness. Moreover, none of these systems are suitable for use as an anti-ice system (i.e. to prevent ice from forming).

Another common approach for de-icing and/or anti-icing aircraft surfaces involves the application of a chemical, such as for example alcohol, to reduce adhesion forces associated with ice accumulation and/or depress the freezing point of water collecting on the surfaces. Such systems may be used while the aircraft is on the ground or in flight. One such system prevents the build-up of ice on the leading edges of airfoil surfaces, including propeller and rotor blades, by the weeping of alcohol from a plurality of holes in an attached titanium cuff. Such an on-board chemical system may be costly to operate and rely on a finite supply of chemical during flight.

Some known anti-ice or de-ice systems include thermally removing ice or preventing the formation of ice. One known system diverts bleed air or hot air from one of the turbine stages to heat the airfoil leading edges. Other known thermal systems employ electrically conducting resistance heating elements, such as those contained in heating pads bonded to the leading edges of the aircraft or on the propeller or rotor blades, or those incorporated into the structural members of the aircraft. Heating pads of this type generally include an electrically conductive material in contact with wire or other metal heating elements dispersed throughout the conductive layer which is sandwiched between two layers of insulation. Electrical energy for the heating elements is derived from a generating source driven by one or more of the aircraft engines. The electrical energy is continuously supplied to provide heat sufficient to prevent the formation of ice or intermittently supplied to loosen accumulating ice. However, such systems are only usable where sufficient wattage is available to raise and/or maintain the temperature of the airfoil surface above the freezing point at typical aircraft speeds.

To achieve operational temperatures for such thermal systems, the power supply required to power a wire heating pad type anti-ice or de-ice system is significant, because of the inefficiencies of the resistive heating pad elements, and may not been a feasible alternative as anti-ice or de-ice systems for general aviation aircraft.

BRIEF DESCRIPTION OF THE INVENTION

One aspect is directed to an anti-icing system that includes a component surface having a composite structure including a composite layer, and at least one heating element formed within the composite layer, wherein the heating element is configured to provide a transfer of heat to the component surface.

Another aspect is directed to an aerodynamic surface that includes a composite structure having at least one composite layer, and an anti-icing system having at least one heating element formed within the composite layer, wherein the heating element is configured to provide a transfer of heat to the aerodynamic surface.

Another aspect is directed to a method for substantially prevent accumulation of ice on an aerodynamic surface. The method includes fabricating a composite structure including at least one composite layer, forming at least one heating element within the composite layer, and configuring the heating element to provide a transfer of heat to the aerodynamic surface.

Various refinements exist of the features noted in relation to the above-mentioned aspects of the present invention. Additional features may also be incorporated in the above-mentioned aspects of the present invention as well. These refinements and additional features may exist individually or in any combination. For instance, various features discussed below in relation to any of the illustrated embodiments of the present invention may be incorporated into any of the above-described aspects of the present invention, alone or in any combination.

BRIEF DESCRIPTION OF THE DRAWINGS

Non-limiting and non-exhaustive embodiments are described with reference to the following figures, wherein like reference numerals refer to like parts throughout the various views unless otherwise specified.

DETAILED DESCRIPTION OF THE INVENTION

Figure 1:
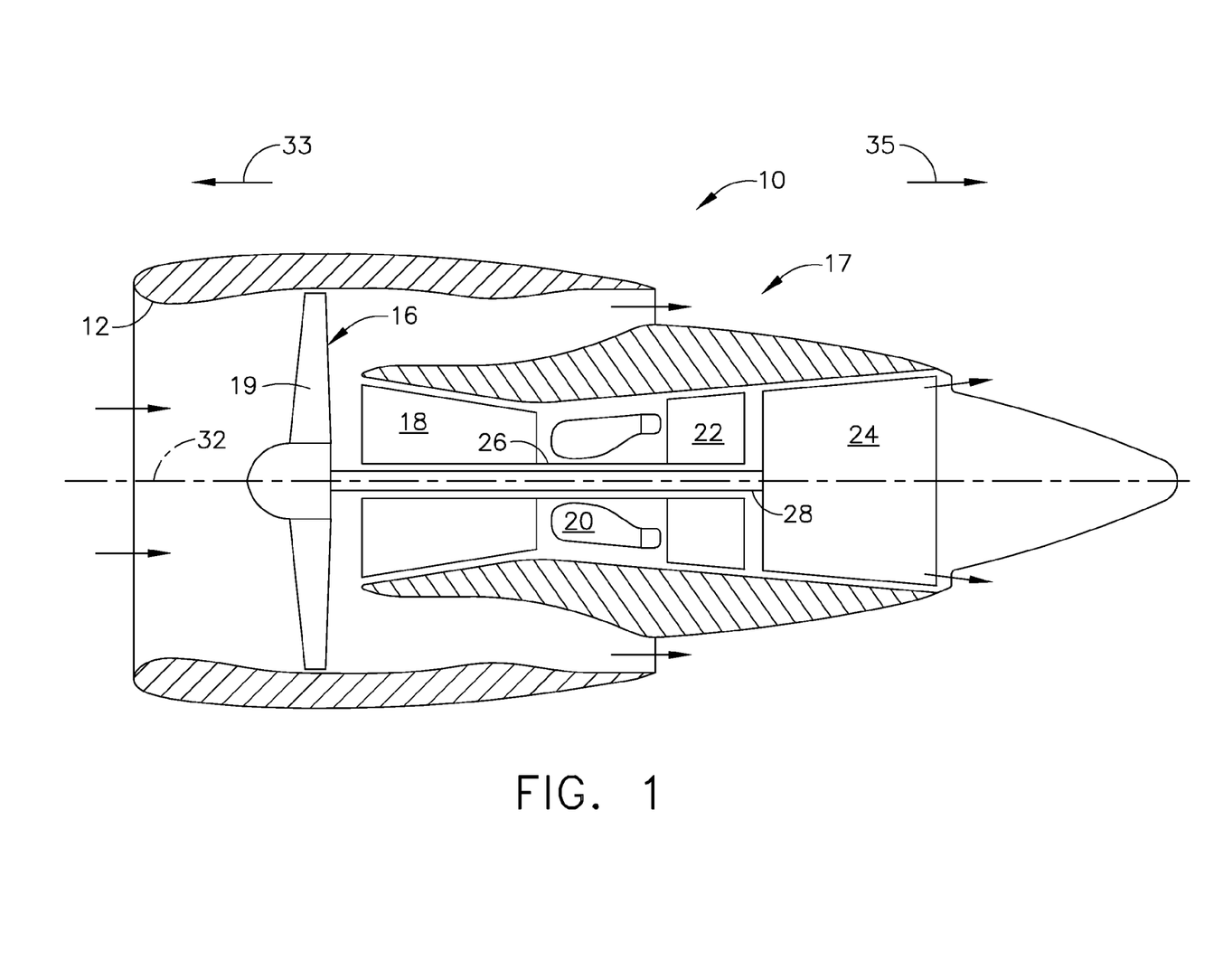
FIG. 1 is a schematic view of an exemplary gas turbine engine.

FIG. 1 is a cross-sectional view of a portion of turbine engine 10. In the exemplary embodiment, turbine engine 10 includes a fan assembly 16 that is rotatably coupled about a longitudinal centerline axis 32. In the exemplary embodiment, fan assembly 16 is positioned at a forward end 33 of turbine engine 10. In an alternative embodiment, fan assembly 16 is positioned at an aft end 35 of turbine engine 10. Fan assembly 16 includes a plurality of rows of fan blades 19 positioned within a nacelle assembly 12. In one embodiment, nacelle assembly 12 houses various operating components (not shown) of turbine engine 10.

In the exemplary embodiment, turbine engine 10 also includes a core engine 17 that is positioned downstream from fan assembly 16. Core engine 17 includes a compressor 18, a combustor 20, and a turbine 22 that is coupled to compressor 18 via a core rotor shaft 26.

During operation, core engine 17 generates combustion gases that are channeled downstream to a turbine 24 which extracts energy from the gases for powering fan assembly 16 through a shaft 28.

Figure 2:
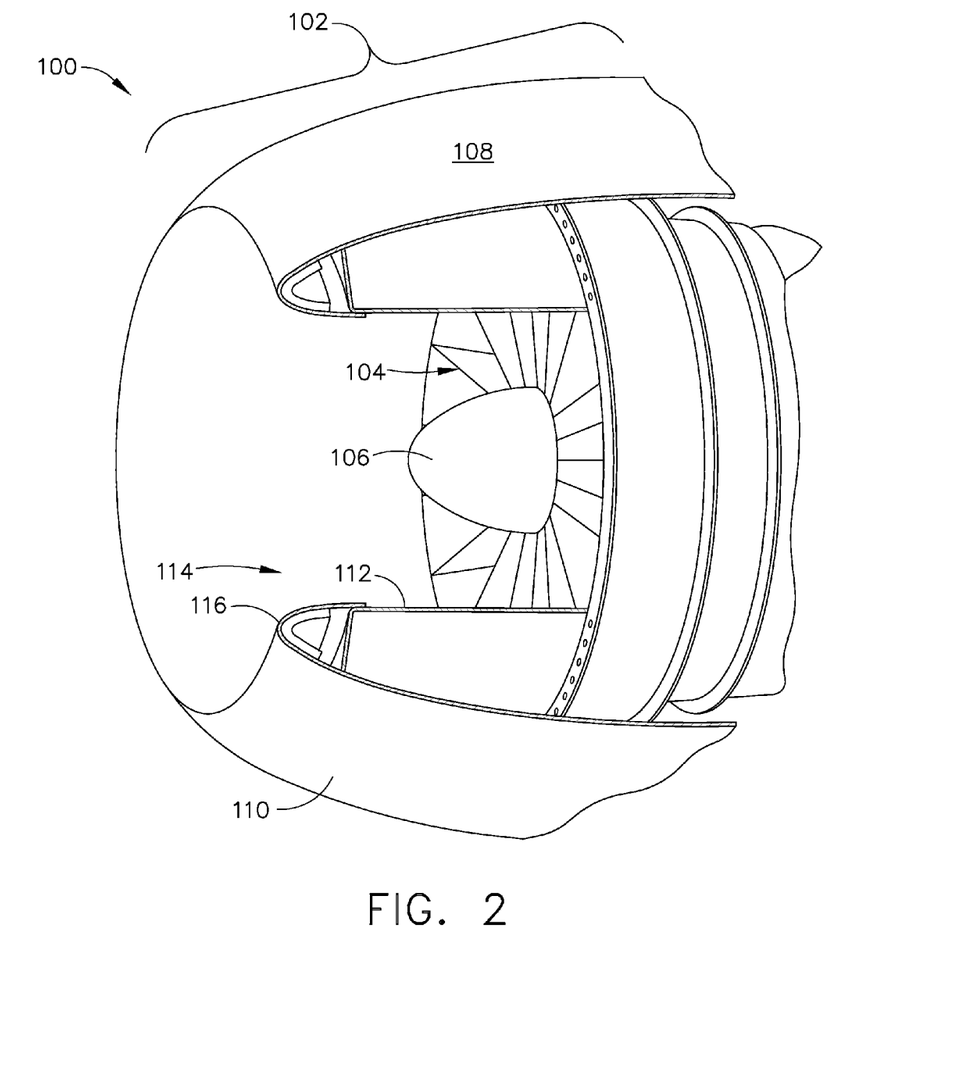
FIG. 2 is a perspective view of an inlet section of the gas turbine engine shown in FIG. 1.

FIG. 2 is a perspective view of an inlet section 100 of gas turbine engine 10 shown in FIG. 1. A forward portion 102 of inlet section 100 includes an intake guide vane assembly 104 and a nose cone 106 enclosed within a generally tubular, axially extending inlet cowl 108 that includes an outboard wall 110 and an inboard wall 112. Inboard wall 112 forms an inlet duct 114 that directs engine inlet air through guide vane assembly 104 and into the engine compressor 22 (shown in FIG. 1).

During flight and/or ground operations under icing conditions, ice tends to form on a leading edge surface 116 of walls 110 and 112. The ice changes the geometry (i.e. area) of inlet duct 114 between cowl 108 and nose cone 106, thereby adversely affecting the required quantity and flow path of incoming air. In addition, pieces of ice may break away and cause damage to internal or external downstream engine components.

Figures 3, 4:
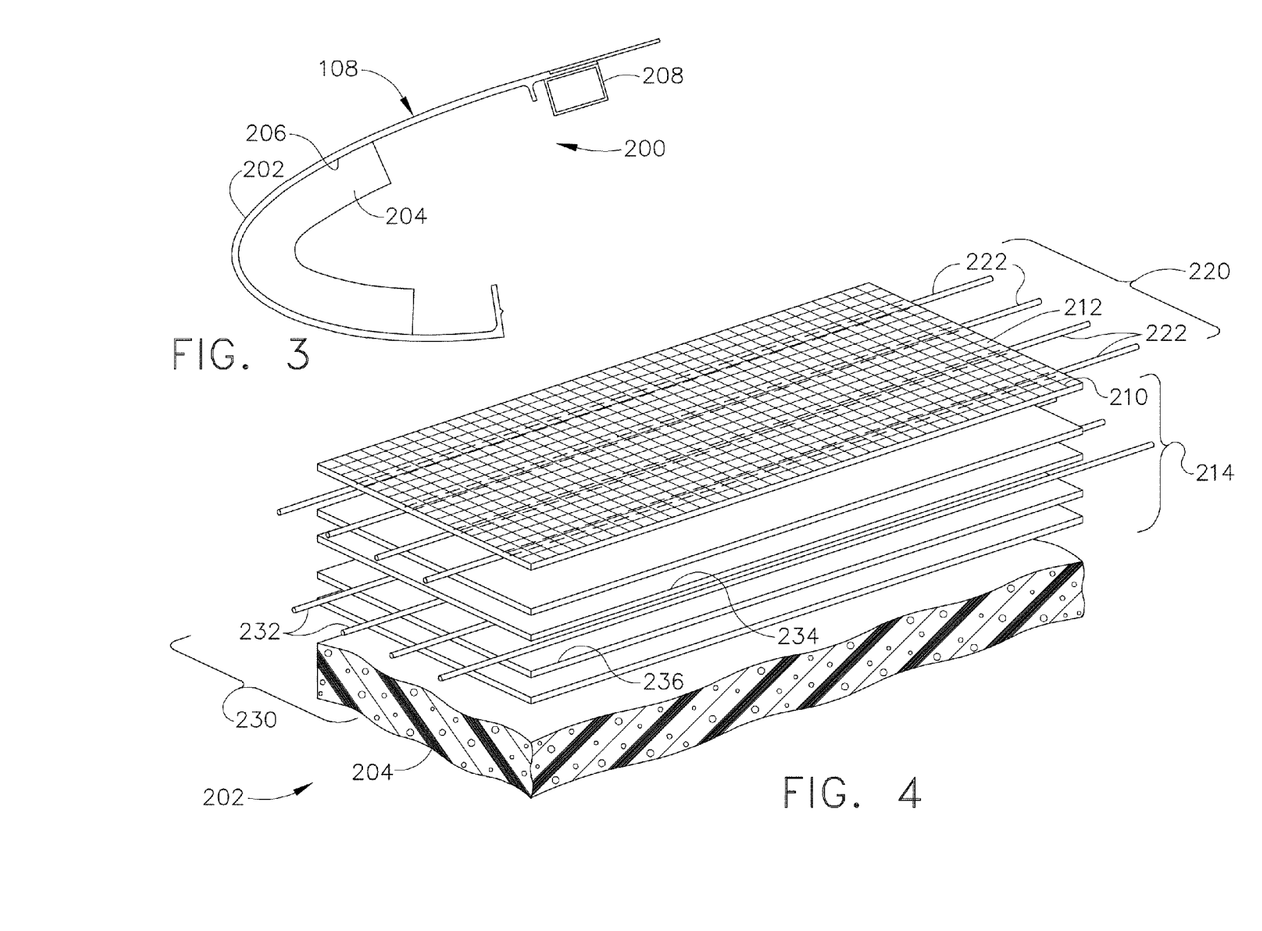
FIG. 3 is an internal view of inlet cowl 108 that includes an exemplary anti-icing system.
FIG. 4 is an exploded view of a portion of external skin shown in FIG. 3 that includes the exemplary anti-icing system.

FIG. 3 is an internal view of inlet cowl 108 that includes an exemplary anti-icing system 200. In the exemplary embodiment, inlet cowl 108 includes an external skin 202 that substantially encloses a foam element 204 that provides a structural reinforcement during aerodynamic and impacting loading, and that provides a foundation for structural repairs. More specifically, and in the exemplary embodiment, foam element 204 is adhesively bonded to an interior side 206 of skin 202. Alternatively, foam element 204 may be adhered to internal side 206 of skin 202 by any method that enables anti-icing system 202 to function as described herein. In the exemplary embodiment, foam element 204 provides insulation for skin 202 to enable a substantially efficient and effective flow of heat through the leading edge of inlet section 100, as described in more detail herein. In the exemplary embodiment, skin 202 is a laminate composite structure, as described in more detail herein. Anti-icing system 200 includes an electrical power source 208 that is electrically coupled to a heating element (not shown in FIG. 3) that enables increasing a temperature of the heating element, wherein power source 208 is positioned adjacent to inlet cowl 108. Alternatively, power source 208 may be positioned in any location that enables anti-icing system 200 to function as described herein.

FIG. 4 is an exploded view of a portion of external skin 202 shown in FIG. 3 that includes exemplary anti-icing system 200. In the exemplary embodiment, external skin 202 is a layered composite matrix that includes a woven carbon-fiber material 210, and a thermoplastic resin 212. Alternatively, the composite matrix may include a graphite weave, or may include a thermoset resin. A plurality of composite layers 214 are illustrated in FIG. 4, however, external skin 202 may include a single composite material layer, or any number of composite material layers that enable anti-icing system 200 to function as described herein.

In the exemplary embodiment, anti-icing system 200 includes a heating element 220 that is woven within a carbon fiber material 214. In the exemplary embodiment, heating element 220 includes a plurality of conductive wires 222 that are each electrically coupled to power source 208 (shown in FIG. 3) and that extend in a substantially uniform orientation within the woven matrix 210. Conductive wires 222 are substantially uniformly spaced within the woven matrix weave, and in the exemplary embodiment are oriented circumferentially around engine cowl leading edge 116 (shown in FIG. 2). Alternatively, conductive wires may be oriented axially within engine cowl 108, or be oriented in any configuration that enables anti-icing system 200 to function as described herein.

During operations, when the heating element/matrix layer combination 210 and 220 is assembled for use, a unitary composite structure is formed. More specifically, heating element 220 provides a transfer of heat to external skin 202 during icing conditions. Such a structure reduces part count by eliminating fastening elements needed to hold the heater elements to inlet surface, and maximizes an efficiency level associated with heat transfer within inlet section by providing a conductive heat from inside the inlet section surface that is prone to ice under icing conditions. Alternatively, heating element 220 may be distributed within woven matrix 210 in any spacing configuration that enables anti-icing system 200 to function as described herein, such as for example braided and/or bunched in groups. Alternatively, heating element 220 may be any electrically conductive component, such as a thread, a ribbon, a plurality of conductive particles, a conductive ink, and/or a conductive nanotube, as is described in more detail herein. In an alternative embodiment, and as shown in FIG. 4, heating element 230 includes a plurality of conductive wires 232 that may be distributed between adjacent woven matrix layers 234 and 236.

Figure 5:
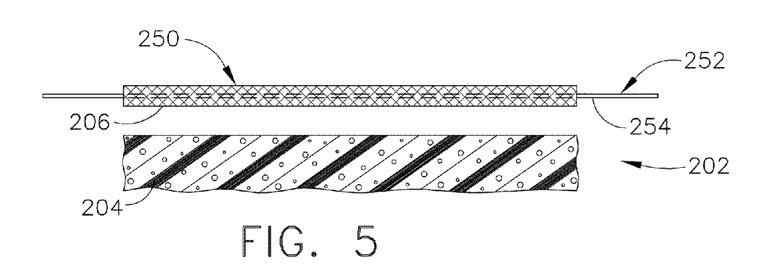
FIG. 5 is an alternative configuration for exemplary anti-icing system that may be used with the engine shown in FIG. 1.

FIG. 5 is an alternative configuration for exemplary anti-icing system 200 used with engine 10 shown in FIG. 1. As described herein, inlet cowl 108 includes a foam element 204 that is couple to an internal side 206 of an external skin 202 as described herein. Referring specifically to FIG. 5, in the illustrated embodiment, external skin 202 is a three-dimensional braided carbon-fiber matrix 250, and includes a heating elements 252 formed within the carbon-fiber matrix 250. More specifically, heating element 252 is woven within matrix 250, alternatively, heating element 252 may be wound therein. When the heating element/matrix layer combination 250 and 252 is assembled for use during operations, a unitary composite structure is formed. In the illustrated embodiment, heating element 252 includes a conductive wire 254 that extends in a substantially uniform orientation within the three-dimensional matrix 252. Alternatively, heating element 252 may be a thread, a ribbon, a plurality of conductive particles, a conductive ink, and/or a conductive nanotube, as is described in more detail herein. Such a structure eliminates use of multiple composite matrix layers, as shown in FIG. 4. However, multiple three-dimensional woven layers, or any number of three dimensional composite layers may be used that enable anti-icing system 200 to function as described herein.

Figure 6:
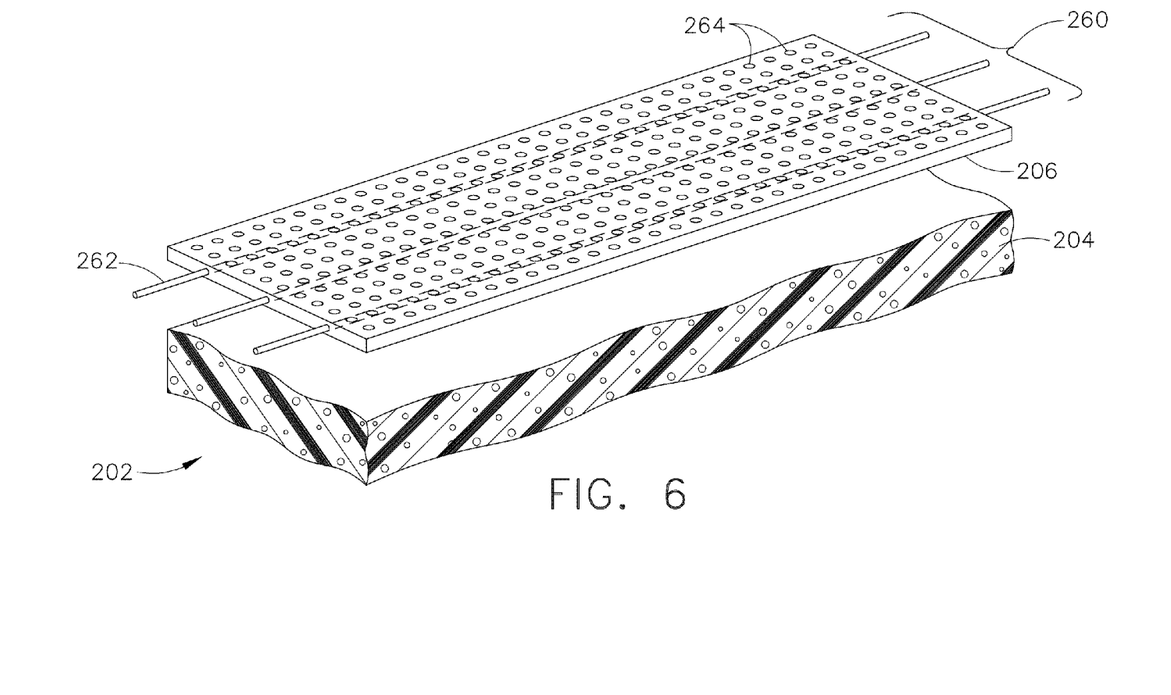
FIG. 6 is a perspective view of an alternative configuration for exemplary anti-icing system that may be used with the engine shown in FIG. 1.

FIG. 6 is a perspective view of an alternative configuration for exemplary anti-icing system 200 used with engine 10 shown in FIG. 1. As described herein, inlet cowl 108 includes a foam element 204 that is coupled to an internal side 206 of an external skin 202 as described herein. Referring specifically to FIG. 6, in the illustrated embodiment, external skin 202 may be a layered composite material as shown in FIG. 4, or a three-dimensional braided carbon-fiber matrix as shown in FIG. 5, and includes a heating element 260 formed within the carbon-fiber layer as described herein. More specifically, heating element 260 includes a plurality of conductive wires 262 that are woven within matrix, alternatively, heating elements may be wound and/or displaced therein to enable anti-icing system 200 to function as described herein.

In the exemplary embodiment, the matrix/heating element combination includes a plurality of acoustic holes 264 formed therein, such that conductive wires 262 are substantially undisturbed during fabrication, i.e. not broken during fabrication of acoustic holes 264. Such a structure enables anti-icing in an aircraft surface where it is also beneficial to reduce the noise thereon, for example immediately aft of the engine cowl leading edge 116, shown in FIG. 2.

In an alternative embodiment, anti-icing system 200 may be used on any aircraft leading-edge surface. More specifically, heating elements, for example heating elements 220 shown in FIG. 4, maybe may be wound, woven and/or otherwise formed within any aircraft surface that is prone to ice during icing conditions, for example a wing leading edge, slat, flap or other control surface, tail leading edge, and/or engine cowl leading edge.

Referring to FIGS. 2-6, during operations, power source 208 energizes heating element 220, 230, 252 and/or 260 that are embedded within the laminate structure of the composite leading edge surface. In the exemplary embodiment, the highly conductive heating elements 220, 230, 252 and/or 260 increase in temperature to a level that is sufficient to substantially prevent a buildup of ice on the external surface of the component leading edge.

Exemplary embodiments of anti-icing systems are described in detail above. The above-described anti-icing systems facilitate substantially preventing a buildup of ice on the external surface of an aircraft leading edge. To prevent ice accumulation, the systems and methods described herein use heating elements formed within a composite structure that defines an aircraft leading edge surface. Such a structure reduces part count by eliminating fastening elements needed to hold the heater elements to inlet surface, and maximizes an efficiency level associated with heat transfer within inlet section by providing a conductive heat from inside the inlet section surface that is prone to ice under icing conditions. Moreover, the anti-icing systems described herein provide structural reinforcement to the skin within which the heating elements are formed.

Moreover, the system and methods described herein overcome many of the deficiencies realized in a pneumatic-type anti-icing system. In contrast to pneumatic system, the system component count and complexity is reduced. Additionally, maintenance on aircraft leading edge surfaces, as well as the anti-icing system themselves is simplified. Furthermore, the system and methods described herein require no engine bleed-air as feedstock as is required by an on-board pneumatic systems. As such, the system has substantially high efficiency when compared to pneumatic systems. The system requires only electrical power for its operation, and requires no major changes to existing systems and re-certification of existing systems. Therefore, non-recurring costs may be substantially lower compared to pneumatic systems, which require changes to the engine bleed-air system, air-conditioning system ram-air system, and/or duct leak detection system.

Although the foregoing description contains many specifics, these should not be construed as limiting the scope of the present disclosure, but merely as providing illustrations of some of the presently preferred embodiments. Similarly, other embodiments may be devised which do not depart from the spirit or scope of the present disclosure. Features from different embodiments may be employed in combination. The scope of the disclosure is, therefore, indicated and limited only by the appended claims and their legal equivalents, rather than by the foregoing description. All additions, deletions and modifications as disclosed herein which fall within the meaning and scope of the claims are to be embraced thereby.

Although the apparatus and methods described herein are described in the context of anti-icing systems for aircraft gas turbine engines, it is understood that the apparatus and methods are not limited to aerospace applications. Likewise, the system components illustrated are not limited to the specific embodiments described herein, but rather, system components can be utilized independently and separately from other components described herein.

As used herein, an element or step recited in the singular and proceeded with the word "a" or "an" should be understood as not excluding plural elements or steps, unless such exclusion is explicitly recited. Furthermore, references to "one embodiment" of the present disclosure are not intended to be interpreted as excluding the existence of additional embodiments that also incorporate the recited features.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. An anti-icing system comprising:
a non-metallic component member comprising:
   a non-metallic composite structure including a plurality of woven non-metallic composite layers;
   an outer surface and an interior surface, said outer surface exposed to icing conditions when said component member is installed in use; and
   a leading tip, a first wall extending in an aft direction from said leading tip, and a second wall extending in the aft direction from said leading tip such that a cross-section of said component member is substantially U-shaped;
a plurality of conductive heating elements positioned adjacent at least one composite layer of said plurality of non-metallic composite layers, said plurality of heating elements comprising an electrically conductive ribbon configured to provide a transfer of heat to said component member, wherein each of said plurality of heating elements extends axially in the aft direction from said leading tip along said first wall and along said second wall, each of said plurality of heating elements configured to conform to the substantially U-shaped cross-section of said component member; and
a structural foam element coupled to said interior surface, said structural foam element configured to facilitate substantially preventing a loss of heat through said interior surface during said heat transfer, said structural foam element further configured to provide structural reinforcement to said component member.

2. An anti-icing system in accordance with claim 1, wherein said at least one composite layer comprises:
   a woven carbon-fiber matrix; and
   one of a thermoplastic bonding agent or a thermoset bonding agent;
   wherein said at least one heating element is positioned adjacent said at least one composite layer forming a unitary composite structure.

3. An anti-icing system in accordance with claim 1, wherein said at least one heating element is wound, woven, or distributed within said at least one composite layer.

4. An anti-icing system in accordance with claim 1, wherein said composite structure comprises a laminate structure including a plurality of layers, said at least one heating element received between said plurality of layers.

5. An anti-icing system in accordance with claim 1, further comprising a power source electrically coupled to said at least one heating element and configured to provide an electrical voltage across said at least one heating element.

6. An aircraft inlet cowl comprising:
a non-metallic component member defining an air inlet duct, said non-metallic component member comprising:
   a non-metallic composite structure including a plurality of woven non-metallic composite layers;
   an outer surface and an interior surface, said outer surface exposed to icing conditions when said component member is installed in use; and
   a leading tip, an outer wall extending in an aft direction from said leading tip, and an inner wall extending in the aft direction from said leading tip such that a cross-section of said component member is substantially U-shaped; and
an anti-icing system comprising:
   a plurality of conductive heating elements positioned adjacent at least one composite layer of said plurality of non-metallic composite layers, said plurality of heating elements comprising an electrically conductive ribbon configured to provide a transfer of heat to said component member, wherein each of said plurality of heating elements extends axially in the aft direction from said leading tip along said first wall and along said second wall, each of said plurality of heating elements configured to conform to the substantially U-shaped cross-section of said component member; and
   a structural foam element coupled to said interior surface, said structural foam element configured to facilitate substantially preventing a loss of heat through said interior surface during said heat transfer, said structural foam element further configured to provide structural reinforcement to said component member.

7. An aerodynamic surface in accordance with claim 6, wherein said at least one composite layer comprises:
   a woven carbon-fiber matrix; and
   one of a thermoplastic bonding agent or a thermoset bonding agent;
   wherein said at least one heating element is positioned adjacent said at least one composite layer forming a unitary composite structure.

8. An aerodynamic surface in accordance with claim 6, wherein said at least one heating element is wound, woven, or distributed within said at least one composite layer.

9. An aerodynamic surface in accordance with claim 6, wherein said composite structure comprises a laminate structure including a plurality of layers, said at least one heating element received between said plurality of layers.

10. An aerodynamic surface in accordance with claim 6, further comprising a power source electrically coupled to said at least one heating element and configured to provide an electrical voltage across said at least one heating element.

11. A method for substantially preventing accumulation of ice on an aerodynamic surface of a non-metallic composite structure, said method comprising:
   fabricating the non-metallic composite structure including a plurality of woven non-metallic composite layers, wherein the composite structure includes an outer surface and an interior surface, the outer surface being exposed to icing conditions when the composite structure is installed in use, and wherein the composite structure includes a leading tip, an outer wall extending in an aft direction from the leading tip, and an inner wall extending in the aft direction from the leading tip such that a cross-section of the composite structure is substantially U-shaped;
   positioning a plurality of conductive ribbon heating elements adjacent at least one composite layer of the a plurality of non-metallic composite layers, wherein positioning the plurality of heating elements includes axially orienting the plurality of heating elements such that each heating element extends in an aft direction from the leading tip along the inner wall and along the outer wall such that each of the plurality of heating elements is configured to conform to the substantially U-shaped cross-section of the composite structure;
   configuring the at least one heating element to provide a transfer of heat to the aerodynamic surface; and
   coupling a structural foam element to the interior surface such that the structural foam element substantially reduces a loss of heat through the interior surface during the heat transfer, and such that the structural foam element provides structural reinforcement to the composite structure.

12. A method in accordance with claim 11, wherein fabricating a composite structure further comprises:
   forming a unitary composite structure by providing a woven carbon-fiber matrix, wherein the at least one heating element is positioned adjacent said at least one composite layer; and
   reinforcing the unitary composite structure using one of a thermoplastic bonding agent or a thermoset bonding agent.

13. A method in accordance with claim 11, wherein fabricating a composite structure further comprises fabricating a laminate structure including a plurality of layers, wherein the at least one heating element is received between the plurality of layers.

14. A method in accordance with claim 11, further comprises electrically coupling a power source to the at least one heating element, the power source configured to provide an electrical voltage across the at least one heating element.

* * * * *